United States Patent [19]

Nemoto et al.

[11] Patent Number: 5,497,280
[45] Date of Patent: Mar. 5, 1996

[54] CASSETTE HOLDER MECHANISM FOR MAGNETIC RECORDING/REPRODUCING APPARATUS

[75] Inventors: Yasuhiro Nemoto, Ibaraki; Kazuto Oyama; Hideharu Ono, both of Katsuta; Kazuo Sakai, Ibaraki, all of Japan

[73] Assignee: Hitachi, Ltd., Tokyo, Japan

[21] Appl. No.: 307,240

[22] Filed: Sep. 16, 1994

[30] Foreign Application Priority Data

Sep. 17, 1993 [JP] Japan .................................. 5-231368

[51] Int. Cl.⁶ .......................... G11B 15/675; G11B 5/008
[52] U.S. Cl. ................... 360/96.5; 360/93; 360/95
[58] Field of Search ........................... 360/96.5, 84–85, 360/95, 93

[56] References Cited

U.S. PATENT DOCUMENTS 5,262,910 11/1993 Hashiguchi et al. .................... 360/96.5
5,293,550 3/1994 Toyoguchi et al. ..................... 360/96.5
5,386,329 1/1995 Ikegawa ..................................... 360/94

FOREIGN PATENT DOCUMENTS 63-214956 9/1988 Japan .................................... 360/96.5

Primary Examiner—John H. Wolff
Attorney, Agent, or Firm—Antonelli, Terry, Stout & Kraus

[57] ABSTRACT

A magnetic recording/reproducing apparatus includes a head for performing recording/reproducing, a chassis for positioning the head, a cassette holder for positioning a cassette on the chassis, the cassette including an opening portion through which a recording medium is received or drawn out, a cassette holder supporting member for supporting the cassette holder on the chassis, and a casing which contains these component parts. The cassette holder supporting member has a substantially U-shape, facing three side surfaces of the cassette except the opening portion, and includes integrally formed fastening portions to be secured on the casing. The cassette holder supporting member is fastened to the casing through two fastening portions, and the chassis is directly fastened to the casing in one portion of the chassis.

12 Claims, 9 Drawing Sheets

CASSETTE HOLDER MECHANISM FOR MAGNETIC RECORDING/REPRODUCING APPARATUS

BACKGROUND OF THE INVENTION

1. Field of the Invention

The present invention relates to a magnetic recording/reproducing apparatus and, more particularly, to a small-size, light-weight magnetic recording/reproducing apparatus in which a magnetic tape cassette is used, e.g., a VCR (Video Cassette Recorder), a camera recorder, or a digital audio tape apparatus (DAT) for household use and business use.

2. Description of the Related Art

Concerning cassette-type magnetic recording/reproducing apparatus represented by camera recorders, weight reduction has been strongly demanded. In order to realize this weight reduction, there have conventionally been taken measures such as decreasing the plate thickness of a chassis, using a material such as aluminum having a smaller specific weight than iron and iron alloy, and shaping the chassis to have a high percentage of cut-out portions or holes. Materials and shapes of conventional chassis are disclosed in, for example, Japanese Patent Unexamined Publication No. 61-271648.

With the conventional chassis structure, the rigidity of the chassis is deteriorated if the plate thickness of the chassis made of aluminum material is decreased or if cut-out portions or holes are formed in the chassis so as to achieve the weight reduction. Therefore, during operation of the apparatus, the chassis is deformed by reaction force of springs for positioning a tape cassette, force exerted on contact points between the tape cassette and the chassis, and so forth. Due to such deformation of the chassis, the accuracy in the traveling position of the tape is deteriorated, which eventually results in problems such as degradation of the recording/reproducing performance with respect to the tape.

As an exterior type casing on which the chassis is fastened, an article molded of plastic is often used. Since its rigidity is low, the exterior type casing is easily deformed when a strong force is applied to it during use of the apparatus. The force is also transmitted to the chassis through fastening portions, and consequently there is a possibility that the accuracy of the chassis will be deteriorated. Moreover, the shape accuracy of the exterior type casing which is an article molded of plastic is inferior to that of the chassis made of aluminum material or the like. Therefore, variation in the shapes of those portions of the exterior type casing to be fastened on the chassis occasionally causes deformation of the chassis at the time of fastening, thus deteriorating plane accuracy of the chassis.

SUMMARY OF THE INVENTION

It is an object of the present invention to provide a magnetic recording/reproducing apparatus having a light-weight, simple chassis structure, in which a cassette holder portion for determining the mounting position of a tape cassette is improved in rigidity, and the plane accuracy of the chassis is prevented from deteriorating.

It is another object of this invention to provide a magnetic recording/reproducing apparatus having a fastening structure such that the plane accuracy of a tape traveling portion of the chassis is prevented from deteriorating even if an exterior type casing on which the chassis is fastened is deformed or varies in accuracy. In order to achieve the above objects, according to the invention, a magnetic recording/reproducing apparatus comprising a head for performing recording/reproducing, a chassis for positioning the head, a cassette holder for positioning a cassette on the chassis, the cassette including an opening portion through which a recording medium is received or drawn out, and a cassette holder supporting member for supporting the cassette holder on the chassis, wherein the cassette holder supporting member has a substantially U-shape, facing three side surfaces of the cassette except the opening portion, and includes integrally formed portions to be fastened on an exterior type casing.

Further, in a magnetic recording/reproducing apparatus comprising a head for performing recording/reproducing, a chassis for positioning the head, a cassette holder for positioning a cassette on the chassis, the cassette containing a recording medium, and a cassette holder supporting member for supporting the cassette holder on the chassis, two portions of the cassette holder supporting member and one portion of the chassis are fastened to an exterior type casing.

Moreover, in a magnetic recording/reproducing apparatus comprising a head for performing recording/reproducing, a chassis for positioning the head, a cassette holder for positioning a cassette on the chassis, the cassette containing a recording medium, a cassette holder supporting member for supporting the cassette holder on the chassis, and an exterior type casing which contains these component parts, the cassette holder supporting member has a substantially U-shape, facing three side surfaces of the cassette except the opening portion and is fastened on the attachment structure, and the chassis is not secured but held between the cassette holder supporting member and the attachment structure. In the apparatus, also, the chassis is fastened to the exterior type casing in only one portion.

Furthermore, in a magnetic recording/reproducing apparatus the cassette holder supporting member has a substantially U-shape, facing three side surfaces of the cassette except the opening portion, and the cassette holder supporting member, the chassis and the exterior type casing are fastened together with each other.

In the above-described structures, the cassette holder supporting member has a substantially U-shape, facing three side surfaces of the cassette except the opening portion so that the structural rigidity is high although it is made of a thin plate. Therefore, a tape cassette mounting portion of the chassis is improved in rigidity, and it is possible to prevent deformation of the chassis when a force which is generated by a pressing force for retaining the tape cassette is applied to the chassis. Further, the cassette holder supporting member is fastened on the exterior type casing through the fastening portions integrally formed with the cassette holder supporting member. Consequently, a fastening reaction force caused by deformation or variation of the shape of the exterior type casing is not directly applied to the chassis, thereby preventing the chassis from deteriorating in accuracy. With the structure in which the cassette holder supporting member, the chassis and the exterior type casing are fastened together with each other, the rigidity of the apparatus can be enhanced.

DETAILED DESCRIPTION OF THE PREFERRED EMBODIMENTS

The preferred embodiments of the present invention will be hereinafter described with reference to the attached drawings.

Figure 1:
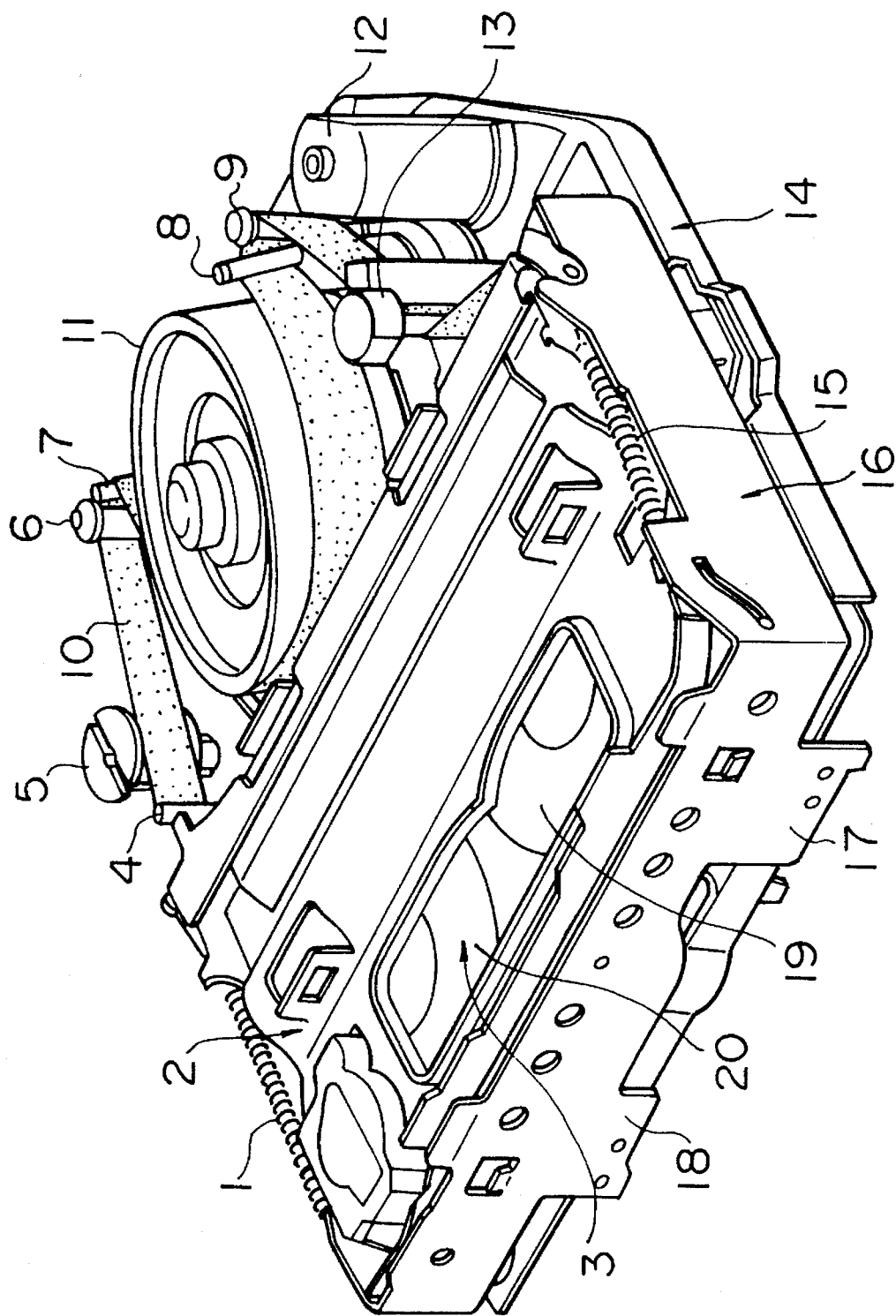
FIG. 1 is a perspective view of a magnetic recording/reproducing apparatus in an operating state according to one embodiment of the present invention.
Figure 2:
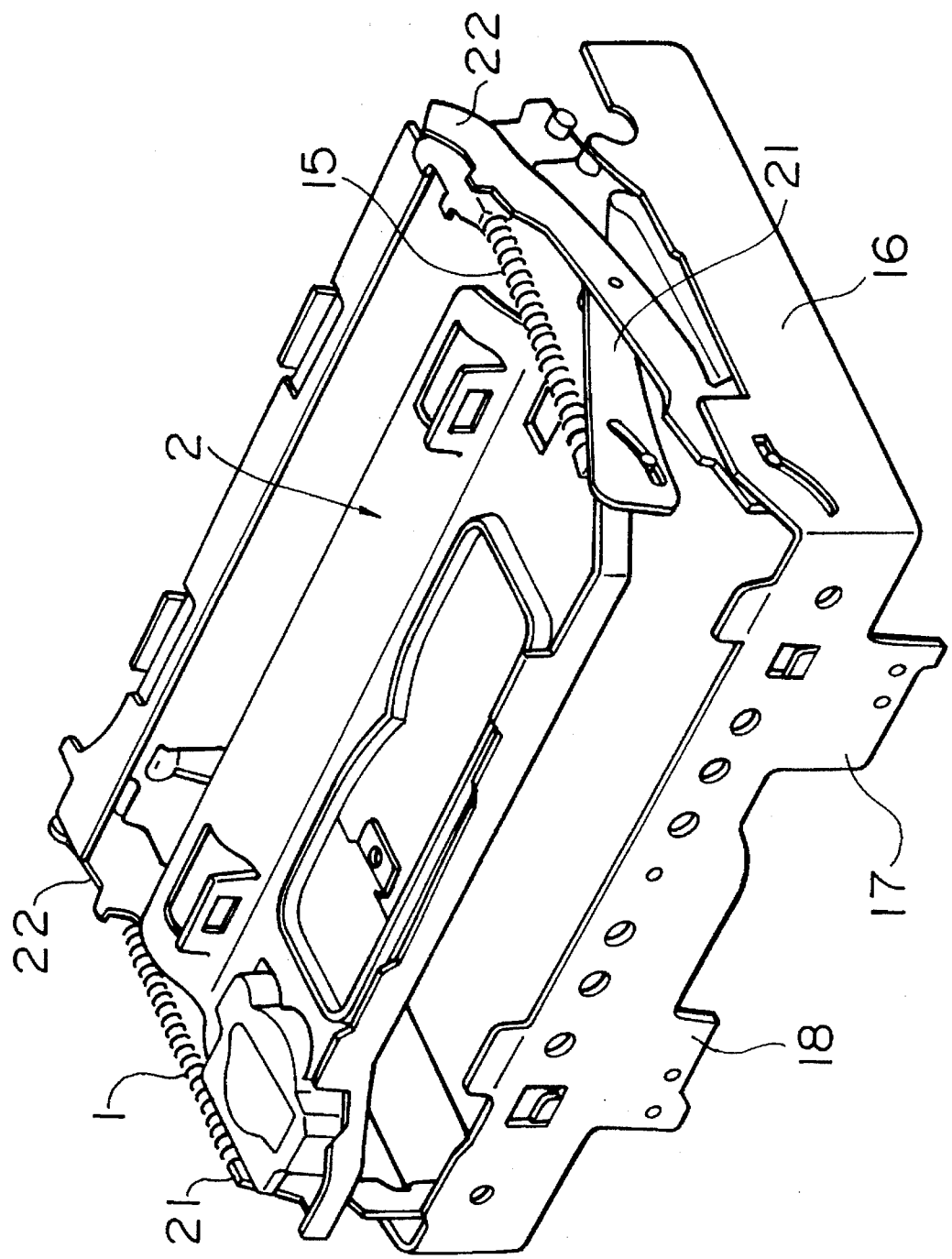
FIG. 2 is a perspective view of a tape cassette holder mechanism in the embodiment of FIG. 1.
Figure 3:
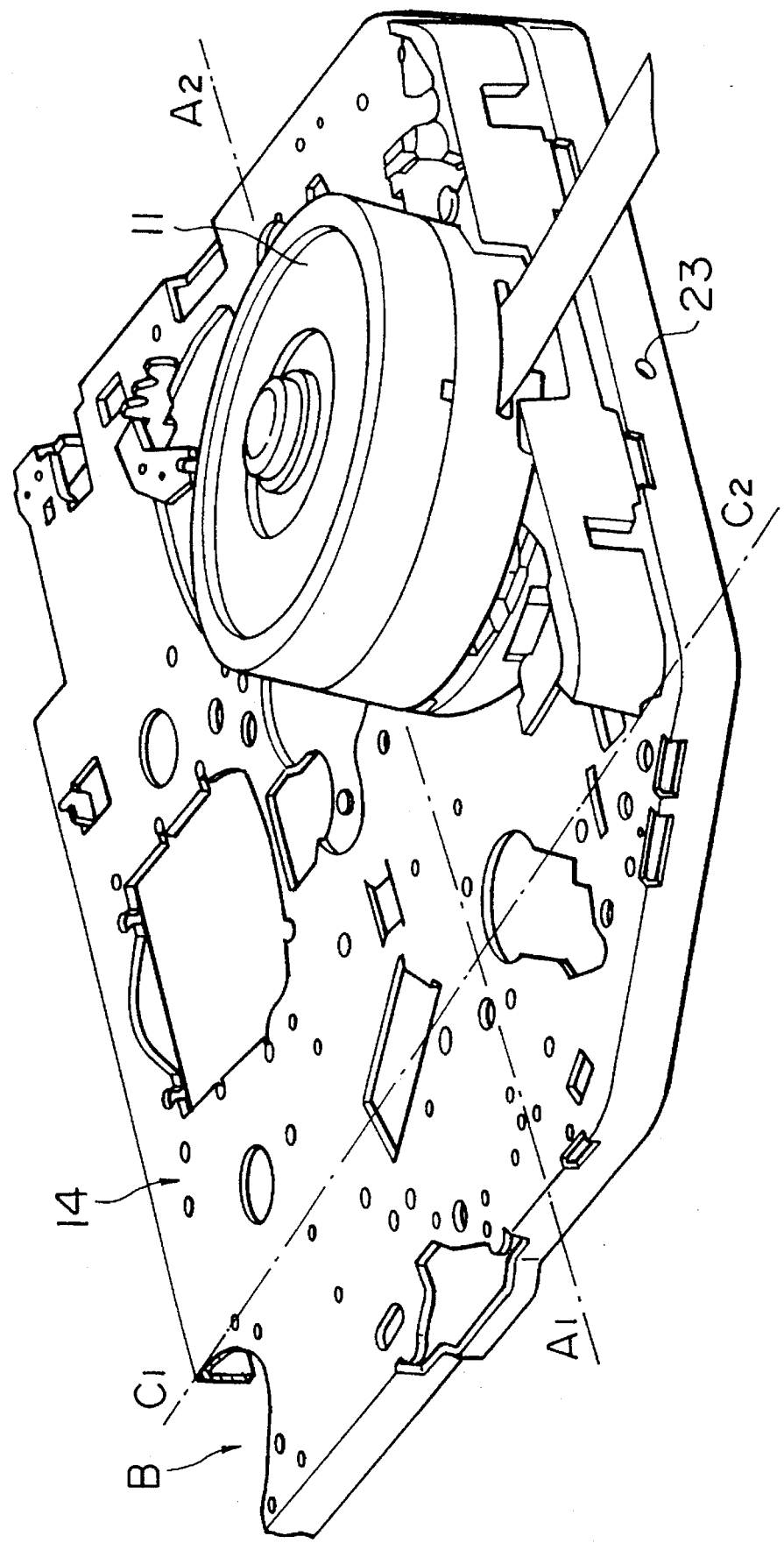
FIG. 3 is a perspective view of a chassis in the embodiment of FIG. 1.
Figure 4:
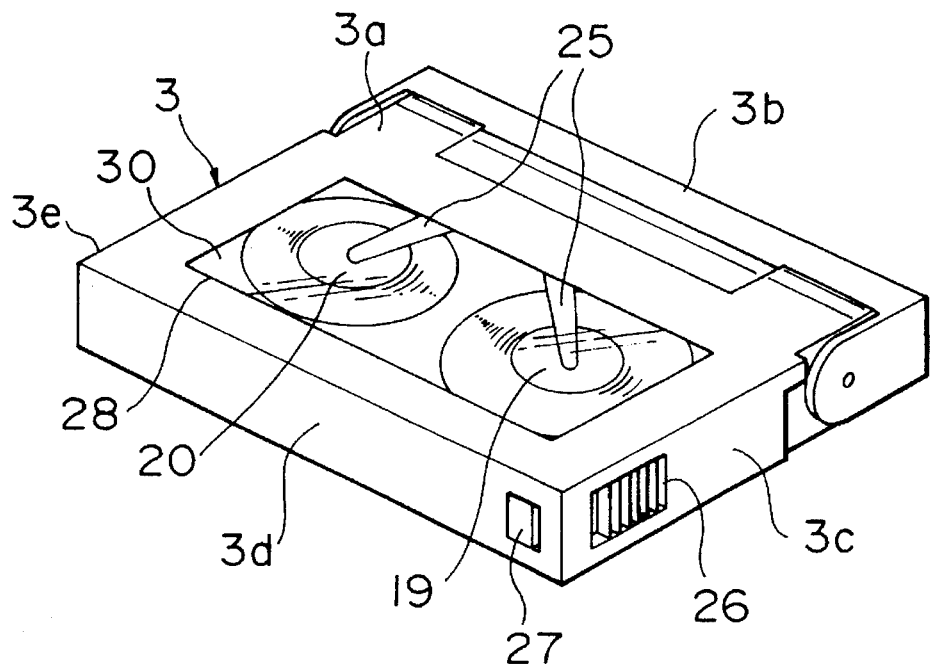
FIG. 4 is a perspective view of an upper surface of a tape cassette.
Figure 5:
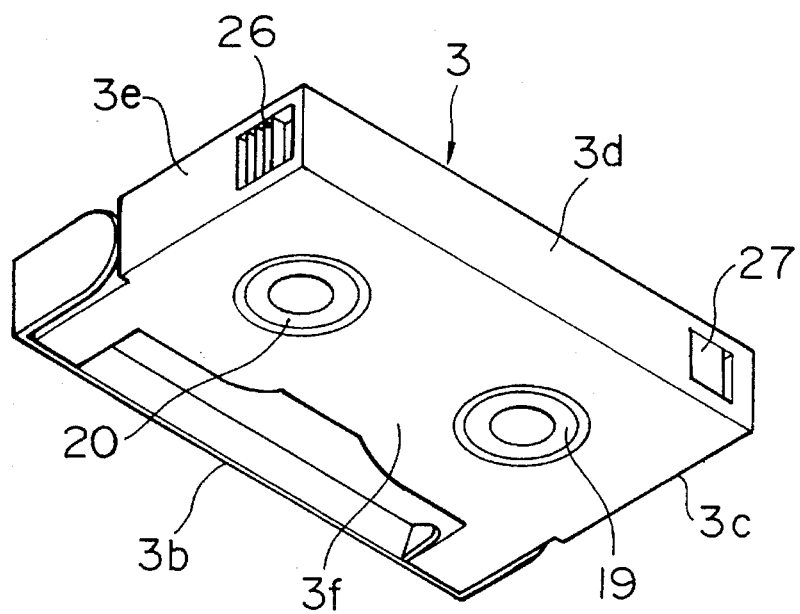
FIG. 5 is a perspective view of a lower surface of the tape cassette.
Figure 10:
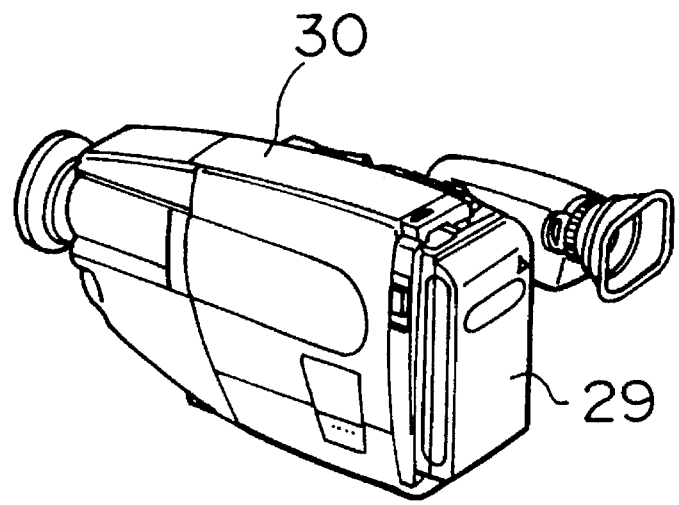
FIG. 10 is the perspective view showing a left-side appearance of the 8 mm camera recorder shown in FIG. 9.
Figure 11:
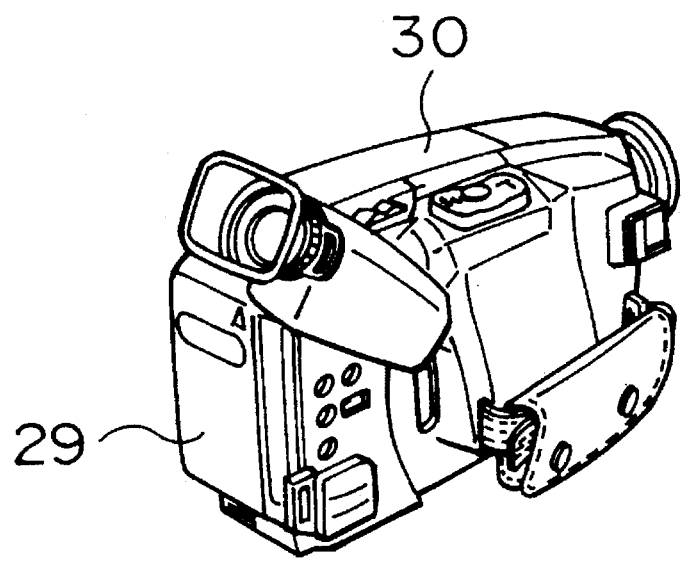
FIG. 11 is the perspective view of a right-side appearance of the 8 mm camera recorder shown in FIG. 9.

FIG. 1 shows one embodiment of the present invention and is a perspective view of a magnetic recording/reproducing apparatus of an 8 mm cassette type in an operating state, which apparatus includes a cassette mounting portion formed of a U-shaped member; FIG. 2 is a perspective view of the cassette mounting portion formed of the U-shaped member according to this embodiment in a cassette discharged state; and FIG. 3 is a perspective view of a chassis, on which only a head assembly and its seat are secured according to this embodiment. Also, an appearance of a tape cassette for an 8 mm camera recorder used in this embodiment are shown in FIGS. 4 and 5. Further, appearances of an example of such an 8 mm camera recorder, as viewed from the rear left side thereof and from the rear right side thereof, are shown in FIGS. 10 and 11, respectively.

As shown in these drawings, reels 19 and 20 are biased toward a positioning reference surface 3f of the tape cassette 3 (its bottom surface shown in FIG. 5) by means of reel springs 25 (FIG. 4) and are supported in the tape cassette 3. The tape cassette 3 is provided with an opening portion 3b whose cover is opened to allow tape 10 to be drawn out or received back during operation of the apparatus. An upper surface 3a of the tape cassette 3 has a window 30 through which the reels 19 and 20 can be seen. Holding grooves 26 for handling the tape cassette 3 are formed on side surfaces 3c and 3e of the cassette 3, and a tab 27 for setting the recording enabling mode or the recording inhibiting mode is provided on a side surface 3d of the cassette 3.

A cassette holder 2 presses this tape cassette 3 on the chassis 14 and retains it in a certain position by use of the reference surface 3f of the cassette 3. The cassette holder 2 and its support mechanism will now be described with reference to FIG. 2. The cassette holder 2 includes a biasing structure for retaining the cassette 3 and positioning the reference surface 3f of the cassette 3 toward the chassis 14 by a force of about 5 newtons. The cassette holder 2 is supported by holder links 21 and 22 in such a manner that it can be vertically moved in an out-of-plane direction of the chassis 14. During recording/reproducing operation, the cassette holder 2 is pressed against the chassis 14, and during discharging operation of the cassette 3, it is moved to a position away from the chassis 14 in the out-of-plane direction.

Ejection springs 1 and 15 for assisting this discharging operation are arranged so that the cassette holder 2 can be constantly maintained in the cassette discharging position (the position away from the chassis 14). Therefore, even in the recording/reproducing position, a force is constantly applied to the cassette holder 2 to move it away from the chassis 14. Normally, in the 8 mm camera recorder, a force of about 3 to 7 newtons is applied to the cassette holder 2, to thereby enable a reliable cassette discharging operation irrespective of the posture of the apparatus and even if it is weighted with the cassette 3.

A lock mechanism (not shown) retains the cassette holder 2 in the recording/reproducing position against the cassette positioning force and the force of the ejection springs described above. This lock mechanism is provided on the chassis 14. During the cassette discharging operation, a mechanism is provided for releasing the lock by use of a driving force of a loading motor 12 (FIG. 1). Therefore, the biasing force of the ejection springs 1 and 15 is applied to the chassis 14. A cassette holder supporting member 16 supports the holder links 21 and 22 such that they can swing and determines the operation position of the foregoing cassette holder 2 as a supporting member, while serving to position the mechanism around the cassette holder 2 on the chassis 14.

As shown in FIG. 3, the chassis 14 is a simple single-plate structure and includes a large number of openings on which other component parts are mounted, and through which members are passed from one side to the other side of the chassis 14 and vice versa. Consequently, the rigidity of the chassis 14 is made low. Further, in order to reduce the weight, a thin aluminum plate having a small specific weight is used as the material of the chassis 14. However, because Young's modulus of the aluminum material is as small as about a third of that of iron or iron alloy, the rigidity is further deteriorated. Since the weight percentage of this chassis 14 as occupied by one of the component parts shown in FIG. 1 is relatively large, the plate thickness of the chassis 14 must be further decreased for the purpose of weight reduction of the apparatus. Currently, an aluminum plate having a thickness of about 1 to 1.2 mm is often used. In order to improve the rigidity of such a low-rigidity chassis, however slightly, the shape of the chassis is changed, for example, the peripheral edge of the chassis is folded or ribs are formed on it. However, the pressing force for positioning the cassette 3 and the reaction force of the ejection springs 1 and 15 are constantly applied to the chassis 14, as described above, and therefore, the chassis 14 is deformed in some cases, thus deteriorating its plane accuracy.

FIG. 1 schematically shows a condition of recording/reproducing operation in which the cassette 3 is located in the predetermined recording/reproducing position, and the tape 10 is drawn from the opening portion of the cassette 3 by drawing members 6, 7, 8 and 9 which also serve as tape guides, and is wound on the head assembly 11. The tape 10 is moved along tape guides 4, 5, 6, 7, 8 and 9 and travels on a predetermined traveling plane. A capstan motor 13 effects friction driving of the tape 10.

When the plane accuracy of the chassis 14 is deteriorated during this operation, accuracies of positions and postures of the tape guides 4 to 9 provided on the chassis 14 are lowered, and consequently, positioning accuracy of the tape 10 is deteriorated, thereby degrading the recording/reproducing performance of the head assembly 11 with respect to the tape 10. If the chassis 14 is deformed to a large degree, the interference between the tape 10 and flange portions of the tape guides 4 to 9 induces damages on the tape 10 in some cases. Further, when the tape guides 4 to 9 are adjusted to enable the tape 10 to travel in an almost normal state while the chassis 14 is deformed, the amount of the adjustment increases in accordance with the degree of the deformation, which results in an increase of the number of the adjustment steps, thereby degrading the productivity.

Figure 8:
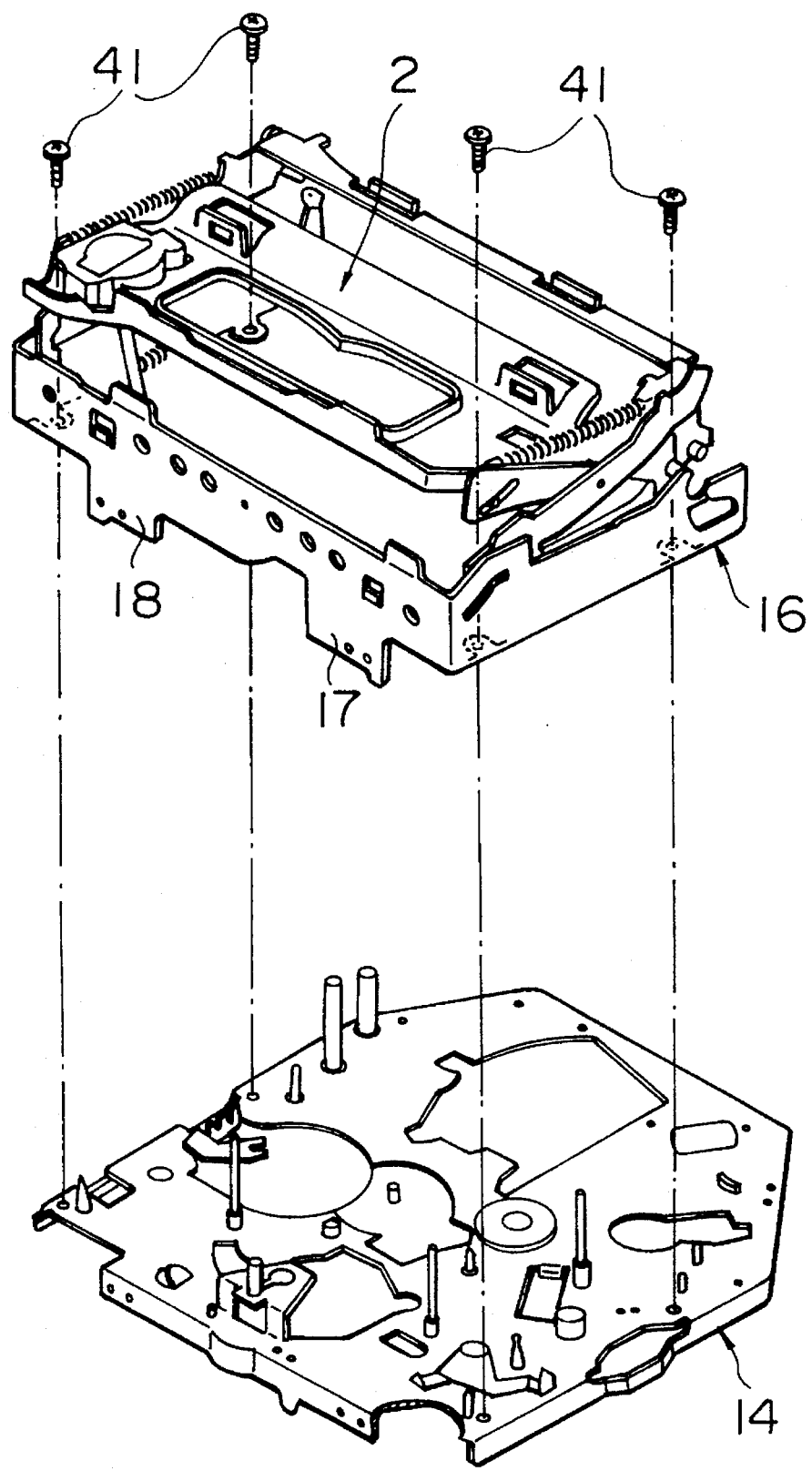
FIG. 8 is a view showing a condition of the cassette holder supporting member to be assembled with the chassis in the embodiment of FIG. 1.

FIG. 8 shows an assembling state of the cassette holder supporting member 16. Short-side portions of the supporting member 16 are secured to the chassis 14 by screw-fasteners 41. In this case, fastening holes are formed in four portions of the cassette holder supporting member 16 which face the chassis 14, so that these portions each are secured to the chassis 14 by the screw-fasteners 41. Needless to say, the fastening portions will not be limited to the short sides of the cassette holder supporting member 16.

In this embodiment, the cassette holder supporting member 16 is a substantially U-shaped member which faces the side surfaces 3c, 3d and 3e of the cassette 3 and surrounds the cassette 3. Since the cassette holder supporting member 16 has a high structural rigidity, it serves to prevent such a deformation of the chassis 14 as caused due to an external force.

Figure 6:
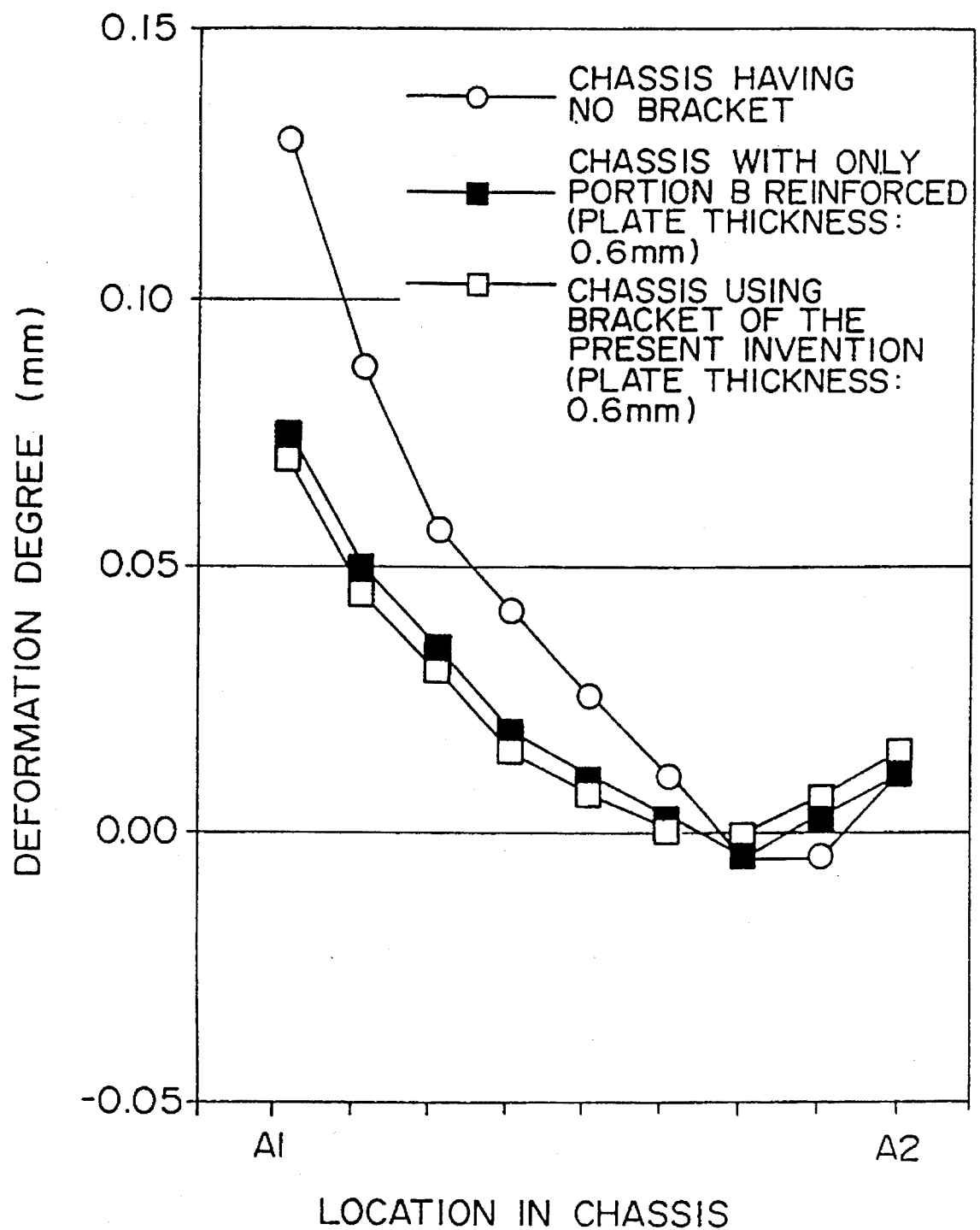
FIG. 6 is a graph illustrating of deformation states of the chassis along cross section $A_1$–$A_2$ shown in FIG. 3.
Figure 7:
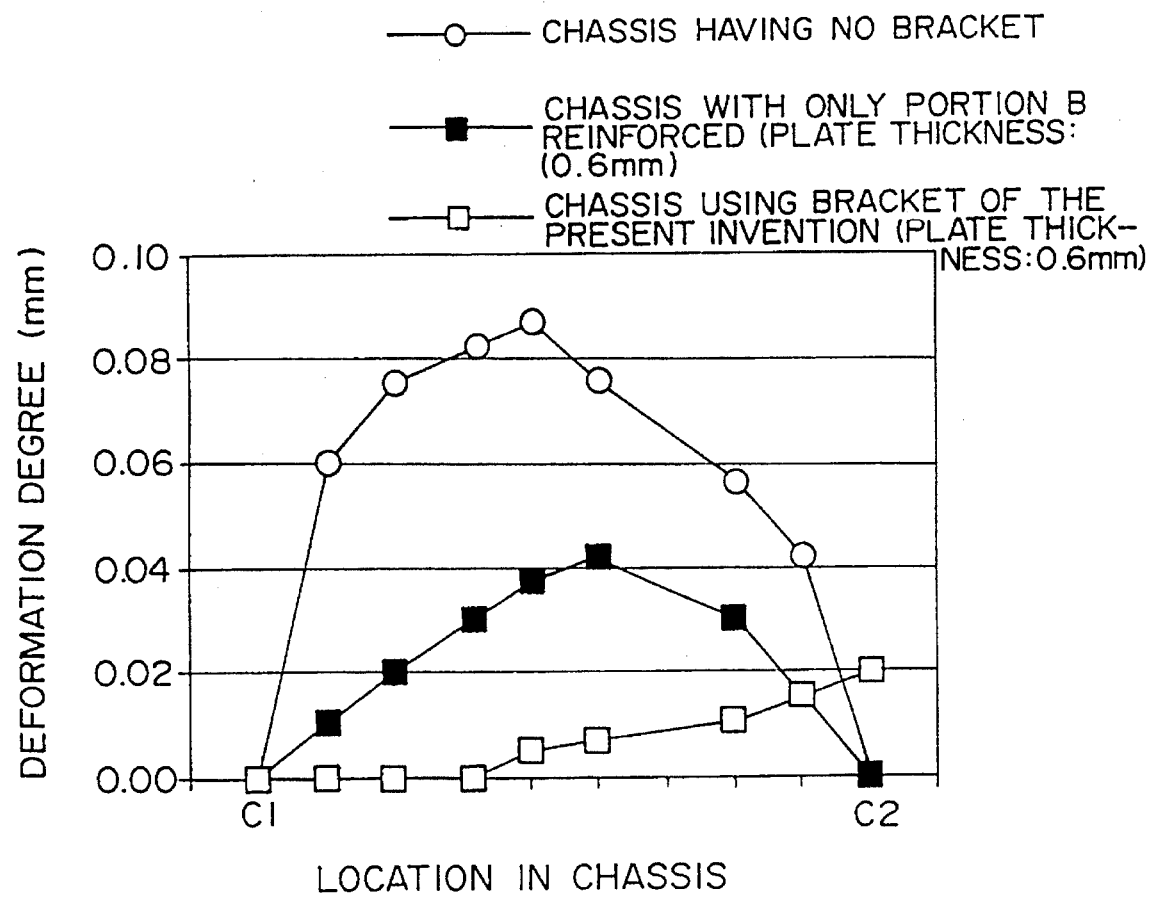
FIG. 7 is a graph illustrating of deformation states of the chassis along cross section $C_1$–$C_2$ shown in FIG. 3.

FIGS. 6 and 7 respectively illustrate examples of results of analysis about deformation states of the chassis 14 in cross sections $A_1$–$A_2$ and $C_1$–$C_2$ shown in FIG. 3, the analysis having been conducted in accordance with a structural analysis program by use of finite elements. When this analysis was performed, the load applied to the chassis during the above-described operation was considered. In FIGS. 6 and 7, a mark ○ indicates the deformation when the cassette holder supporting member 16 of this embodiment was not provided, and a mark □ indicates the deformation when a cassette holder supporting member 16 made of iron material having a thickness of 0.6 mm was provided. Also, a mark ■ indicates the deformation when only a cut-out portion B of the chassis shown in FIG. 3 was reinforced by iron material having the same thickness of 0.6 mm.

In this embodiment, a chassis made of aluminum material having a thickness of 1.0 mm are used. In this case, considering the mass-productivity, the upper limit value of deformation of the chassis is about 0.15 mm. In order to improve the mass-productivity further, the deformation of the chassis is, preferably, not more than 0.10 mm. The reason is that when the chassis deformation degree is large, the position accuracy of the tape guides and the like provided on the chassis is deteriorated, and the accuracy of the traveling position of the tape is also deteriorated during actual operation of the apparatus. As the chassis deformation degree is reduced, the time required for adjusting the tape guides after assembly of the apparatus can be shortened, thereby improving the traveling position accuracy of the tape.

It can be understood from the foregoing analysis results that whereas the chassis is deformed to a large degree when the cassette holder supporting member 16 of this embodiment is not provided, the deformation of the chassis can be effectively decreased by using the cassette holder supporting member 16. Also, it can be understood that the deformation of the chassis 14 in the cross section $C_1$–$C_2$, when the cassette holder supporting member 16 of this embodiment is used, is smaller than the deformation when only the portion B shown in FIG. 3 is reinforced, although iron material having the same thickness is employed. Therefore, by means of the cassette holder supporting member 16 of this embodiment, the deformation of the chassis can be decreased while the weight is kept light, thus preventing deterioration of the accuracy.

Figure 9:
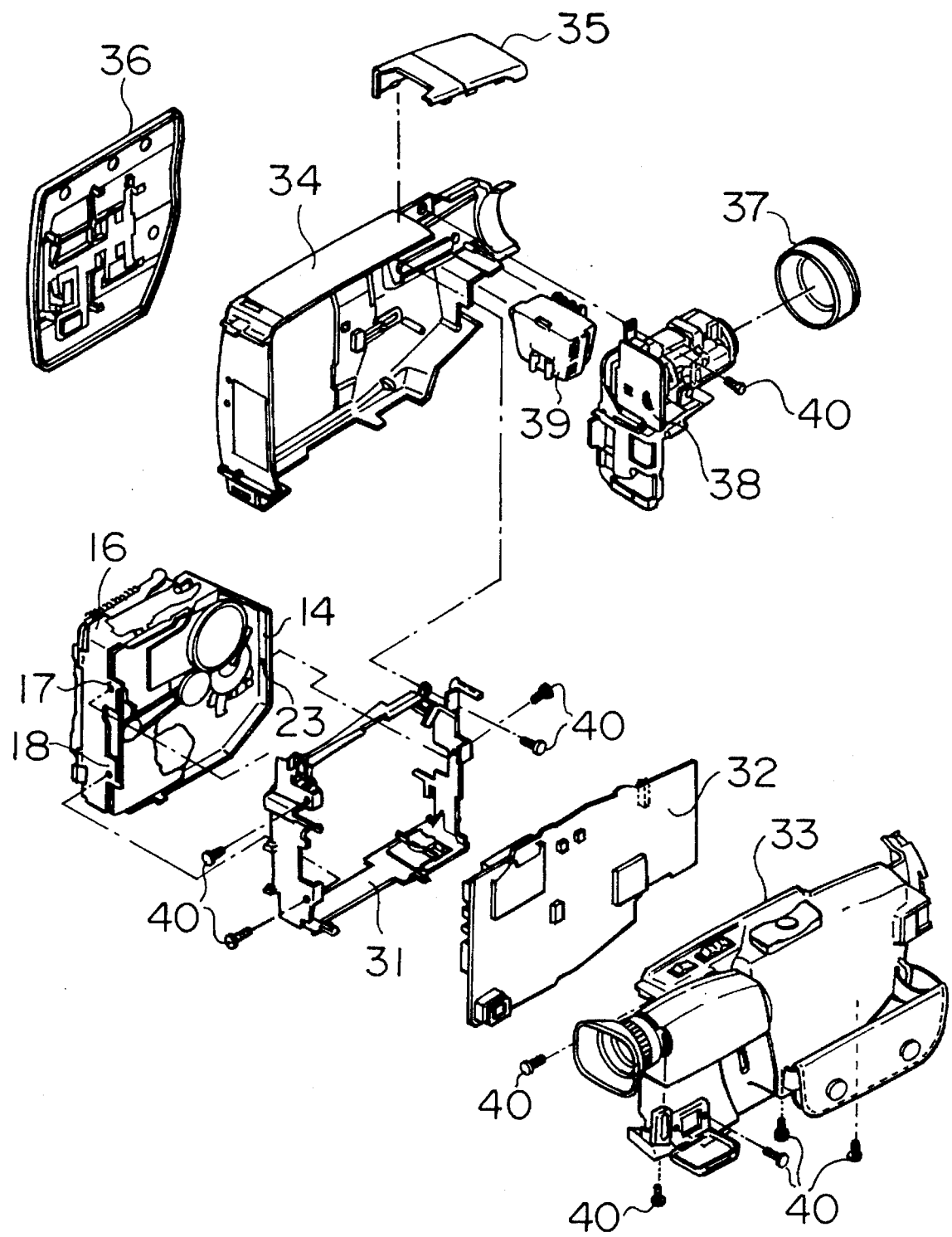
FIG. 9 is an exploded, perspective view of a main body of an 8 mm camera recorder which includes a chassis assembly in which the magnetic recording/reproducing apparatus according to the embodiment of FIG. 1 is incorporated.

FIG. 9 shows an assembling state of an 8 mm camera recorder in which the magnetic recording/reproducing apparatus including the chassis 14 and the cassette holder supporting member 16 of the above-described structure is incorporated. As shown in this figure, an exterior type casing 31 is secured on a fastening point 23 of the chassis 14 using a screw-fastener 40. Fastening portions 17 and 18 of the cassette holder supporting member 16 are likewise secured on the exterior type casing 31 by screw-fasteners 40, although the fastening portions 17 and 18 are provided offset from the attachment surface of the chassis 14 and, in this case, are projected. This exterior type casing 31 is interposed and positioned between a right casing half 33 and a left casing half 34, and secured on the left casing half 34 by screw-fasteners 40. A circuit board 32 is engaged and assembled with the exterior type casing 31 adjacent to the chassis 14. Further, a microphone unit 39 and a lens unit 38 are held and fixed between the left casing half 34 and the right casing half 33. A lens hood 37 is connected to the lens unit 38 and protects the lens. A top cover 35 is held between the left casing half 34 and the right casing half 33, thereby completing an armor of the camera recorder.

In this embodiment, a cassette lid 36 is engaged with the cassette holder 2. Further, in the operation position, the cassette lid 36 is closely fitted on the left casing half 34 and biased thereon by a leaf spring (not shown) so as to prevent dusts from entering from the outside. The biasing force of the cassette lid 36 is applied, as a load, to the chassis 14 via the cassette holder 2 and the cassette holder supporting member 16. Moreover, the exterior type casing 31 is made of plastic to make it light, and consequently, adequate accuracy of its shape can not be obtained, and the distortion or the like during the assembly of the apparatus is too large to ignore. The load generated due to such errors and distortion of the shape is absorbed by the cassette holder supporting member 16 according to the present invention, and also, the load applied to the chassis 14 is reduced, thus maintaining high accuracy of the chassis 14. In a magnetic recording/reproducing apparatus designed to be portable, such as the 8 mm camera recorder shown in FIGS. 10 and 11, the mechanism therefor is required to have a light weight, while, if the structure of the present invention is used in that mechanism, the apparatus can adequately satisfy the need that it must have a light weight and a high accuracy.

The two fastening projection portions 17 and 18 are integrally formed with one side surface of the cassette holder supporting member 16 of this embodiment, and these fastening projection portions 17 and 18 are secured on the exterior type casing 31. Conventionally, three points of the chassis 14 are secured to the exterior type casing 31. However, in order to solve the problem of chassis deformation, component parts such as an independent bracket and reinforcing members must be added to the chassis. In the recording/reproducing apparatus having the chassis structure according to this embodiment, the one portion 23 of the chassis 14 and the two fastening projection portions 17 and 18 of the cassette holder supporting member 16 are fastened to the exterior type casing. Consequently, for example, even if accuracy of fastening portions of the exterior type casing varies, the fastening projection portions 17 and 18 are deformed so that an external force is not exerted directly on the chassis 14, thus preventing deterioration of plane accuracy of the chassis 14. Therefore, as obviously understood from this embodiment, there can be realized a highly accurate and highly productive apparatus having a simple structure which can nevertheless prevent deterioration of plane accuracy of the chassis.

In another structure for preventing deterioration of plane accuracy of a chassis, the chassis, a cassette holder supporting member according to the present invention and an exterior type casing are integrally fastened with one another, thereby improving rigidity of the apparatus.

In the above-described embodiment, two fastening members 17 and 18 to be secured to the exterior type casing 31 are formed on the cassette holder supporting member 16. However, as another embodiment, they can be united into one member. In this case, the fastening portion 23 of the chassis 14 and the exterior type casing 31 are secured by two screw-fasteners so that the plane posture of the chassis 14 can be maintained. In this embodiment, although accuracy in the positions of the exterior type casing 31 and the fastening point 23 of the chassis 14 is required, the shape of the cassette holder supporting member 16 can be simplified.

Moreover, in the foregoing embodiment, the fastening members 17 and 18 to be fixed on the exterior type casing 31 are formed on the surface of the cassette holder supporting member 16 which is opposite to the rear surface 3d of the cassette 3. However, the present invention will not be limited to this design. The fastening members 17 and 18 may be formed on the surfaces of the cassette holder supporting member 16 which are opposite to the side surfaces 3c and 3e of the cassette 3, respectively. In this case, as the distance from the fastening points of the cassette holder supporting member 16 to be fixed on the chassis 14 to the fastening points of the fastening members 17 and 18 to be fixed on the exterior type casing 31 is longer, the load due to positioning errors or deformation of the exterior type casing 31 or the like can be absorbed more easily, and it is easier to maintain the accuracy of the chassis 14. Therefore, by changing the fastening points of the cassette holder supporting member 16 and the chassis 14, the positions of the fastening members 17 and 18 shown in FIG. 2 can be changed without decreasing the effect of maintaining accuracy of the chassis 14.

According to the present invention, as has been described heretofore, in the light-weight chassis which is thin and has low rigidity, the tape cassette mounting portion can be improved in rigidity with a simple structure, and the deterioration of plane accuracy of the chassis owing to the cassette positioning reaction force can be prevented. Further, the chassis is fastened to the exterior type casing through the cassette holder supporting member so that the deterioration of plane accuracy of the chassis will not be induced even if the accuracy of the exterior type casing varies. Thus, a highly accurate and highly productive magnetic recording/reproducing apparatus can be provided.

What is claimed is:

1. A magnetic recording/reproducing apparatus comprising a head assembly including a head for recording/reproducing magnetic signals, a chassis for positioning said head assembly, a cassette holder for positioning a recording cassette on said chassis, the recording cassette including an opening portion through which a recording medium is drawn out from within the recording cassette, a cassette holder supporting member for supporting said cassette holder on said chassis, and a casing containing said head assembly, said chassis, said cassette holder, and said cassette holder supporting member, wherein said cassette holder supporting member has a substantially U-shape, so that when a recording cassette is held in said cassette holder, said cassette holder supporting member faces the three side surfaces of the cassette other than the opening portion, and wherein said cassette holder supporting member includes integrally formed fastening portions secured to said casing.

2. A magnetic recording/reproducing apparatus according to claim 1, wherein said cassette holder supporting member further includes attaching portions remote from said fastening portions and attached to said chassis, and wherein said fastening portions are offset from a plane at which said attaching portions attach said cassette holder supporting member to said chassis.

3. A magnetic recording/reproducing apparatus comprising a head assembly including a head for recording/reproducing magnetic signals, a chassis for positioning said head assembly, a cassette holder for positioning a recording cassette on said chassis, the recording cassette containing a recording medium, a cassette holder supporting member for supporting said cassette holder on said chassis, and a casing containing said head assembly, said chassis, said cassette holder, and said cassette holder supporting member, wherein said cassette holder supporting member includes two fastening portions fastened to said casing, and said chassis includes one fastening portion fastened to said casing.

4. A magnetic recording/reproducing apparatus according to claim 3, wherein said two fastening portions of said cassette holder supporting member are located opposite said one fastening portion of said chassis.

5. A magnetic recording/reproducing apparatus according to claim 3, wherein said two fastening portions of said cassette holder supporting member are located on a longitudinal side of said cassette holder supporting member, and said one fastening portion of said chassis is located on a side of said chassis on which said head assembly is positioned.

6. A magnetic recording/reproducing apparatus as claimed in claim 5, wherein said cassette holder supporting member further includes four additional fastening portions fastened to said chassis, two of said additional fastening portions being located on each of two short sides of said cassette holder supporting member.

7. A magnetic recording/reproducing apparatus according to claim 3, wherein said cassette holder supporting member further includes two additional fastening portions positioned on a short side of said cassette holder supporting member and attached to said chassis.

8. A magnetic recording/reproducing apparatus comprising a head assembly including a head for recording/reproducing magnetic signals, a chassis for positioning said head assembly, a cassette holder for positioning a recording cassette on said chassis, the recording cassette containing a recording medium, a cassette holder supporting member for supporting said cassette holder on said chassis, and a casing, containing said head assembly, said chassis, said cassette holder, and said cassette holder supporting member, wherein said cassette holder supporting member has a substantially U-shape go that when a recording cassette is held in said cassette holder, said cassette holder supporting member faces the three side surfaces of the cassette other that the opening portion, and wherein said cassette holder supporting member is fastened on said casing, and said chassis is supported by said cassette holder supporting member and said casing.

9. A magnetic recording/reproducing apparatus comprising a head assembly including a head for recording/reproducing magnetic signals, a chassis for positioning said head assembly, a cassette holder for positioning a recording cassette on said chassis, the recording cassette containing a recording medium, a cassette holder supporting member for supporting said cassette holder on said chassis, and a casing containing said head assembly, said chassis, said cassette holder, and said cassette holder supporting member, wherein said chassis is fastened to said casing at one portion of said chassis.

10. A magnetic recording/reproducing apparatus comprising a head assembly including a head for recording/reproducing magnetic signals, a chassis for positioning said head assembly, a cassette holder for positioning a recording cassette on said chassis, the recording cassette containing a recording medium, a cassette holder supporting member for supporting said cassette holder on said chassis, and a casing, containing said head assembly, said chassis, said cassette holder, and said cassette holder supporting member, wherein said cassette holder supporting member has a substantially U-shaped so that when a recording cassette is held in said cassette holder, said cassette holder supporting member faces the three side surfaces of the cassette other than the opening portion, and wherein said cassette holder supporting member, said chassis and said casing are fastened together.

11. A magnetic recording/reproducing apparatus according to claim 10, wherein said cassette holder supporting member is fastened on said chassis on side surfaces adjacent to the opening portion of the cassette, and wherein said cassette holder supporting member is fastened on said casing on the side of said chassis on which the opening portion of the cassette is positioned.

12. A magnetic recording/reproducing apparatus according to claim 10, wherein said chassis is fastened on said casing on the side of said chassis opposite the opening portion of the cassette.

* * * * *